(12) United States Patent
Maron

(10) Patent No.: US 9,330,245 B2
(45) Date of Patent: May 3, 2016

(54) CLOUD-BASED DATA BACKUP AND SYNC WITH SECURE LOCAL STORAGE OF ACCESS KEYS

(71) Applicant: Dashlane SAS, Puteaux (FR)

(72) Inventor: Guillaume Maron, Paris (FR)

(73) Assignee: Dashlane SAS, Puteaux (FR)

( * ) Notice: Subject to any disclaimer, the term of this patent is extended or adjusted under 35 U.S.C. 154(b) by 0 days.

(21) Appl. No.: 13/692,766

(22) Filed: Dec. 3, 2012

(65) Prior Publication Data

US 2013/0145447 A1 Jun. 6, 2013

Related U.S. Application Data

(60) Provisional application No. 61/565,729, filed on Dec. 1, 2011.

(51) Int. Cl.
*G06F 21/31* (2013.01)
*H04L 29/06* (2006.01)

(52) U.S. Cl.
CPC ............ *G06F 21/31* (2013.01); *H04L 63/0838* (2013.01); *H04L 2463/082* (2013.01)

(58) Field of Classification Search
CPC ................ G06F 21/31; H04L 63/0838; H04L 2463/082
USPC .............................................. 726/6; 713/182
See application file for complete search history.

(56) References Cited

U.S. PATENT DOCUMENTS

| | | | |
|---|---|---|---|
| 5,434,918 A * | 7/1995 | Kung et al. | 713/169 |
| 5,495,533 A * | 2/1996 | Linehan et al. | 713/155 |
| 5,560,008 A * | 9/1996 | Johnson et al. | 726/5 |
| 5,684,951 A * | 11/1997 | Goldman et al. | 726/6 |
| 6,044,155 A * | 3/2000 | Thomlinson et al. | 713/155 |
| 7,472,423 B2 * | 12/2008 | DeCenzo et al. | 726/26 |
| 8,006,280 B1 * | 8/2011 | Hildebrand et al. | 726/1 |
| 8,059,818 B2 * | 11/2011 | Asokan et al. | 380/277 |
| 8,601,600 B1 * | 12/2013 | Shankar | H04L 63/0428 380/277 |
| 8,990,888 B2 * | 3/2015 | Busser | G06F 21/31 380/44 |
| 2002/0122553 A1 * | 9/2002 | Kao | H04L 9/0891 380/28 |
| 2003/0177401 A1 * | 9/2003 | Arnold | H04L 9/0863 713/155 |
| 2004/0123159 A1 * | 6/2004 | Kerstens et al. | 713/202 |

(Continued)

OTHER PUBLICATIONS

Dashlane Security Whitepaper, Nov. 2011 https://www.dashlane.com/download/Security-Whitepaper-Final-Nov-2011.pdf.*

(Continued)

*Primary Examiner* — Joseph P Hirl
*Assistant Examiner* — J. Brant Murphy
(74) *Attorney, Agent, or Firm* — Merchant & Gould P.C.

(57) ABSTRACT

Methods and systems are provided for secure online data access. In one embodiment, three levels of security are provided where user master passwords are not required at a server. A user device may register with a storage service and receive a user device key that is stored on the device and at the service. The user device key may be used to authenticate the user device with the storage service. As data in the storage service is encrypted with a master password, the data may be protected from disclosure. As a user master key or derivative thereof is not used in authentication, the data may be protected from a disclosure or breach of the authentication credentials. Encryption and decryption may thus be performed on the user device with a user master key that may not be disclosed externally from the user device.

17 Claims, 7 Drawing Sheets

(56) References Cited

U.S. PATENT DOCUMENTS

| | | | |
|---|---|---|---|
| 2004/0187018 A1* | 9/2004 | Owen et al. | 713/200 |
| 2005/0222963 A1* | 10/2005 | Johnson | 705/67 |
| 2005/0228994 A1* | 10/2005 | Kasai et al. | 713/168 |
| 2006/0235796 A1* | 10/2006 | Johnson et al. | 705/44 |
| 2007/0011724 A1* | 1/2007 | Gonzalez et al. | 726/4 |
| 2007/0192841 A1* | 8/2007 | Kim | 726/5 |
| 2008/0104709 A1* | 5/2008 | Averyt et al. | G06F 21/6218 726/27 |
| 2008/0155276 A1* | 6/2008 | Chen et al. | 713/193 |
| 2008/0216153 A1* | 9/2008 | Aaltonen | G06F 21/31 726/3 |
| 2009/0235346 A1* | 9/2009 | Steinberg | 726/8 |
| 2009/0288143 A1* | 11/2009 | Stebila et al. | 726/3 |
| 2010/0005287 A1* | 1/2010 | Rollins | 713/150 |
| 2010/0017616 A1* | 1/2010 | Nichols et al. | 713/183 |
| 2010/0083358 A1* | 4/2010 | Govindarajan et al. | 726/6 |
| 2010/0100945 A1* | 4/2010 | Ozzie et al. | 726/5 |
| 2010/0172504 A1* | 7/2010 | Allen | H04L 9/0825 380/286 |
| 2010/0174911 A1* | 7/2010 | Isshiki | G06F 21/31 713/182 |
| 2010/0228987 A1* | 9/2010 | Dinov | G06F 21/141 713/183 |
| 2011/0009092 A1* | 1/2011 | Etchegoyen | 455/411 |
| 2011/0252243 A1* | 10/2011 | Brouwer | H04L 9/0894 713/189 |
| 2012/0072979 A1* | 3/2012 | Cha et al. | 726/7 |
| 2012/0131656 A1* | 5/2012 | Slaton et al. | 726/6 |
| 2012/0192253 A1* | 7/2012 | Betsch et al. | 726/4 |
| 2012/0323717 A1* | 12/2012 | Kirsch | 705/26.1 |
| 2013/0111217 A1* | 5/2013 | Kopasz et al. | 713/189 |
| 2013/0318581 A1* | 11/2013 | Counterman | H04W 12/06 726/7 |

OTHER PUBLICATIONS

LastPass Gets the Green Light from Security Now!'s Steve Gibson, LastPass Blog, (http://blog.lastpass.com/2010/07/lastpass-gets-green-light-from-security.html), Jul. 21, 2010.*

How does LastPass store my passwords on their website?, Stack Exchange (http://webapps.stackexchange.com/questions/11361/how-does-lastpass-store-my-passwords-on-their-website), Jan. 16, 2011.*

* cited by examiner

CLOUD-BASED DATA BACKUP AND SYNC WITH SECURE LOCAL STORAGE OF ACCESS KEYS

CROSS-REFERENCES TO RELATED APPLICATION

This application claims the benefit of U.S. Provisional Application No. 61/565,729, filed Dec. 1, 2011, which is hereby incorporated by reference in its entirety for all purposes.

FIELD OF THE INVENTION

The present invention relates to the field of online server storage generally, and in particular to online server storage using locally stored access keys.

BACKGROUND

It has become quite popular to use online storage for "anywhere-access" to data and easy synchronization. In some configurations, this is referred to as "cloud storage." In most cases where individual persons, organizations and/or companies want to securely store their data, there is some authentication needed for access to the data and authentication can be in the form of an access key such as a password.

As used herein, "user" can refer to individual persons, organizations, companies, entities or the like, be they humans using computer interfaces or computers using computer interfaces, that desire or need to store data in online storage. "Online storage" refers to storage that is accessible from more than one location or device via a network or other electronic communications medium. In many cases, the online storage is partitionable, so that more than one user can access their distinct partitions. So that authorized users can access a given partition of online storage and unauthorized users cannot (in most cases that are within security expectations) access that partition, some sort of access control is provided. "Access" can include the ability to read data from the partition, write data to the partition, modify data in the partition, possibly also reading, writing, and/or modifying metadata about the data and to delete data/metadata. The stored data can be in the form of data records, files, blobs or other data structures. Access might also be to resources other than just data, such as computing equipment, cloud computing capabilities, network-connected devices (printers, other equipment), money, the ability to control a transaction, etc.

Access to a partition (or even to online storage elements as a whole) might be controlled by a server, router, device, software, etc. that decides whether to allow access to particular users. Partitions might be hard coded (e.g., each user has a fixed 100 MB portion of memory managed on the storage server) or just logically partitioned (e.g., each user can upload some number of photos, up to some designated limit, onto a photo album server and those uploaded photos are associated with the user who/which uploaded them).

Access might be determined by the controller based on authentication—wherein a particular user uses a computing device or other input means to identify to the controller that the user is actually that user and not a hacker, poser or unauthorized person (which may be someone within the company running the controller and cloud servers or someone outside the company). One method of authentication is to assign or generate an access key, provide the access key to an authorized user with the understanding that each authorized user will not share the access key with an unauthorized user, so that the controller can assume that a user is authorized if the user proves access to the access key.

In recent years, the Internet and especially the Web (the collection of HTML and similarly formatted, possibly interlinked set of documents that are typically accessed using a browser or app or similar tool, over a network or storage element), has become an important media, present in the daily life of a majority of people and useful for interfaces to online storage. These services often require user authentication, requiring entering of a username and a password to allow access to the customer account for each service, including personal and confidential data.

A very specific example is an online file storage server that controls access using passwords and is accessible through the Internet. The storage server might maintain a list of users and the file areas they are allowed access to, and the user list might include the passwords of all of the users. Then, when someone connects over a public Internet connection to the storage server and attempts to access a particular file, the server could hold off on the request until the user provides a user identifier (such as a "username") and a password. Once those are provided, the storage server looks up the username in the user list, checks the provided password against the password stored in the user list for that user and if the passwords match, the storage server then looks up in the user list to determine what partitions or files the user has the authority to access, and serves the requested content/file/data to the user if the requested content/file/data is within that user's authority.

There are a number of known problems with this approach. First, it is often an expectation of users that their online storage is accessible only to them and not necessarily to employees of the company or entity that operates the online storage server. This expectation is not met if those employees have ready access to user passwords, as then they would be able to pose as those users, typically outside the scope of their actual employment responsibilities. Also, if an interloper is able to watch network traffic, the interloper may be able to grab usernames and passwords, thereby violating the security assumption that only authorized users will have access to secured data.

One partial solution that has been in use is to eliminate the storage of passwords at the storage server and instead just store hashes of passwords. A "hash" of some data item is a function of that data item that is "one-way" in that computing the data item having only the hash of it is considerably harder (or perhaps impossible) than computing the hash having only the data item.

In a hash-based storage system, the data to be stored on the storage server is encrypted using the user's password and the encryption is done at the user's local device. Examples of local devices are computers, laptops, smart phones, tablets, and other computing devices under local control of the user. When the data is initially sent to the storage server to be written to the user's partition, it is sent already encrypted and the user also provides a hash of the user's password. Of course, this might all be done behind the scenes by client software that simply asks a user to specify the file to upload and does the rest.

In any case, the storage server stores the encrypted data and the hash of the user's master password used to encrypt the data. Later, when the user wants to read or download that data, the user supplies the user master password to the storage server, the storage server computes the hash (or perhaps the hash of the password is created at the user's side and sent to the storage server), compares it to the stored hash, and if there is a match, it serves the requested file to the user's client software so the user can have the data locally. The client software may also automatically decrypt the served data, again using the master password.

While this is better than straight storage of master passwords in the clear at the storage server and transmission of the data when the storage server handles the encryption/decryption, there are still problems. When the master password is used both for authentication to the server and for data decryption, the master password will typically be stored on the server. This can create problems, because if the user list is hacked into by unauthorized agents, or accessed by a sabotaging employee, many passwords can be compromised. Even where only the hashes are stored, there is a risk, because with enough time and computing power, an unauthorized agent can run analysis on tables of password hashes to guess weak passwords that would hash to the values stored in the password hash table.

Thus, there is a need for a more secure storage and online access solutions, especially where the data being stored is of a sensitive nature.

BRIEF SUMMARY

In various embodiments of a storage system task using aspects of the present invention, In one embodiment, three levels of security are provided where user master passwords or a derivative thereof are not required at a server. A user device may register with a storage service and receive a user device key that is stored on the device and at the service. The user device key may be used to authenticate the user device with the storage service. As data in the storage service is encrypted with a master password, the data may be protected from disclosure. As a user master key or derivative thereof is not used in authentication, the data may be protected from a disclosure or breach of the authentication credentials. Encryption and decryption may thus be performed on the user device with a user master key that may not be disclosed externally from the user device. In another embodiment, a computerized system is provided for components implementing the method described above.

In one embodiment, a client device requests access to a storage server on behalf of a particular user. When the storage server determines that a new client device is used, or is new for the particular user, authorization is required via a side channel. The client device authenticates for that user. A unique user device key is generated specific to that user and that device. The unique user device key identifier is stored in a user database of the storage server. The unique user device key identifier is provided to the client device. The unique user device key identifier is encrypted with a user master password at the client device. User access to elements controlled by that user is provided, when the client device provides the unique user device key identifier to the storage server.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

DETAILED DESCRIPTION OF THE INVENTION

As explained herein, methods, systems and apparatus are provided that provide for secure online storage and access to data and/or resources. Those skilled in the art will appreciate that logic and examples used to handle online storage described herein have many applications and that improvements inspired by one application have broad utility in diverse applications that employ techniques used in other applications. Below, example hardware is described that might be used to implement aspects of the present invention, followed by a description of software elements.

Network Client Server Overview

Figure 1:
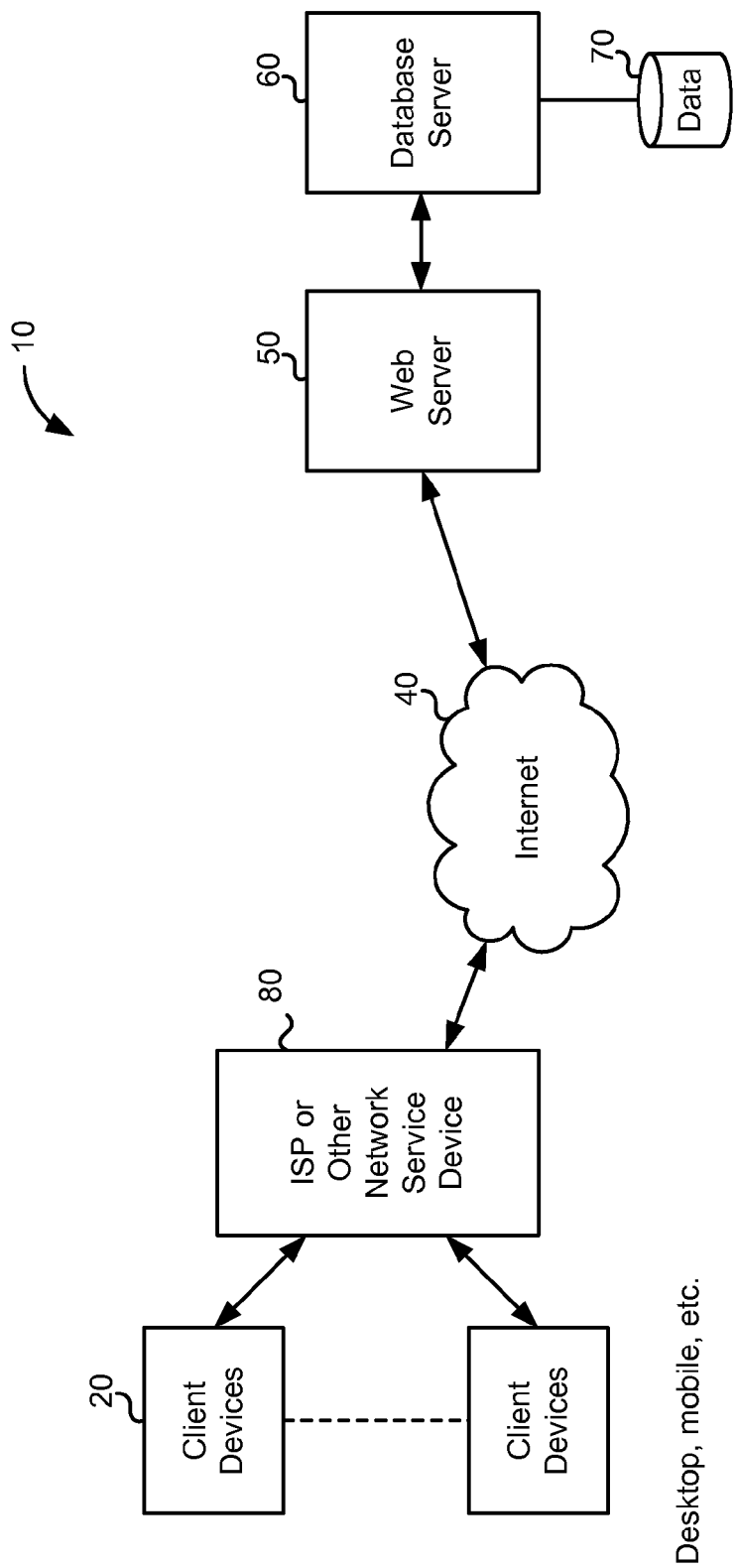
FIG. 1 is a simplified block diagram of one embodiment of a networked, Internet client server system in accordance with at least one embodiment.

FIG. 1 is a simplified functional block diagram of an embodiment of a storage system 10 in which embodiments described herein may be implemented. Storage system 10 is shown and described in the context of network interfaces between user clients and server apparatus coupled to a network (in this example, the Internet 40). However, the system described here is used only as an example of one such system into which embodiments disclosed herein may be implemented. Various components described herein can also be implemented in other systems. While description of FIG. 1 centers on web technologies, such as a web browser and web server, other communication technologies may be used such as an application programming interface server and native client application.

Storage system 10 may include one or more clients 20. For example, a desktop web browser client 20 may be coupled to Internet 40 via a network gateway. In one embodiment, the network gateway can be provided by Internet service provider (ISP) hardware 80 coupled to Internet 40. In one embodiment, the network protocol used by clients is a TCP/IP based protocol, such as HTTP. These clients can then communicate with web servers and other destination devices coupled to Internet 40.

An online storage system might include an access control server that operates with an HTTP Web server front-end, so that users interact using a client browser. Thus, a client 20 can communicate with storage server 80 via its connectivity to Internet 40. Storage server 80 can be one or more computer servers, load-balanced to provide scalability and fail-over capabilities to clients accessing it.

A web server 50 can also be coupled to Internet 40. Web server 50 is often connected to the Internet via an ISP. Client 20 can communicate with web server 50 via its connectivity to Internet 40. Web server 50 can be configured to provide a network interface to program logic and information accessible via a database server 60. Web server 50 can be one or more computer servers, load-balanced to provide scalability and fail-over capabilities to clients accessing it.

In one embodiment, web server 50 houses parts of the program logic that implements the storage access control described herein. For example, it might allow for downloading of software components, e.g., client-side plug-ins and other applications required for the systems described herein, and synching data between the clients running such a system and associated server components.

Web server 50 in turn can communicate with database server 60 that can be configured to access data 70. Database server 60 and data 70 can also comprise a set of servers, load-balanced to meet scalability and fail-over requirements of systems they provide data to. They may reside on web server 50 or on physically separate servers. Database server 60 can be configured to facilitate the retrieval of data 70. For example, database server 60 can retrieve data requested by users as described herein and forward it to clients communicating with web server 50.

One of the clients 20 can include a desktop personal computer, workstation, laptop, personal digital assistant (PDA), cell phone, or any WAP-enabled device or any other computing device capable of interfacing directly or indirectly to Internet 40. Web client 20 might typically run a network interface application, which can be, for example, a browsing program such as Microsoft's Internet Explorer™, Netscape Navigator™ browser, Mozilla's Firefox™ browser, Opera's browser, Google's Chrome™ browser, Apple's Safari™ browser and/or a WAP-enabled browser executing on a cell phone, PDA, other wireless device, or the like. The network interface application can allow a user of web client 20 to access, process and view information and documents available to it from servers in the system, such as web server 50.

Web client 20 also typically includes one or more user interface devices, such as a keyboard, a mouse, touch screen, pen or the like, for interacting with a graphical user interface (GUI) provided by the browser on a display (e.g., monitor screen, LCD display, etc.), in conjunction with pages, forms and other information provided by servers. Although the system is described in conjunction with the Internet, it should be understood that other networks can be used instead of or in addition to the Internet, such as an intranet, an extranet, a virtual private network (VPN), a non-TCP/IP based network, any LAN or WAN or the like.

According to one embodiment, web client 20 and all of its components are operator configurable using an application including computer code run using a central processing unit such as an Intel Pentium™ processor, an AMD Athlon™ processor, or the like or multiple processors. Computer code for operating and configuring client system 20 to communicate, process and display data and media content as described herein is preferably downloaded and stored on a processor readable storage medium, such as a hard disk, but the entire program code, or portions thereof, may also be stored in any other volatile or non-volatile memory medium or device as is well known, such as a ROM or RAM, or provided on any media capable of storing program code, such as a compact disk (CD) medium, a digital versatile disk (DVD) medium, a floppy disk, and the like. Additionally, the entire program code, or portions thereof, may be transmitted and downloaded from a software source, e.g., from one of the servers over the Internet, or transmitted over any other network connection (e.g., extranet, VPN, LAN, or other conventional networks) using any communication medium and protocols (e.g., TCP/IP, HTTP, HTTPS, FTP, Ethernet, or other media and protocols).

It should be appreciated that computer code for implementing aspects of the present disclosure can be C, C++, HTML, XML, Java, JavaScript, etc. code, or any other suitable scripting language (e.g., VBScript), or any other suitable programming language that can be executed on a client or server or compiled to execute on a client or server.

A Storage Access Process

Using the hardware described above, or other hardware, users might upload data securely and access that data securely, even with a risk of interlopers sniffing the network and unethical operators with access to the hardware at an online storage server facility.

In the approach described in this section, storage of user master passwords may be avoided by the storage server, as well as derivatives of the user master passwords. To access encrypted data stored on a secured storage servers, the user's client device first authenticates with the storage server. Each client device (one user might have multiple devices or change from device to device) may be separately authenticated.

In one embodiment, a client device is authenticated by the following operations:

The client device contacts the storage server and requests access on behalf of a particular user.

When the storage server determines that this is a new client device, or is new for the particular user, it requires authorization, which might be in the form of sending a message through a distinct channel to a destination prearranged with that user, such as sending the user an e-mail message or a text message. The message might include a one-time password and the storage server will request that the client device provide that one-time password.

Once the client device is properly authenticated for that user, the storage server generates a unique user device key specific to that user and that device.

The unique user device key identifier is stored in the user database of the storage server.

The unique user device key identifier is provided to the client device, which encrypts it locally with the user master password.

Later, when the user desires access to upload, download or otherwise access partitions/files/data/resources controlled by that user, the client device provides the unique user device key identifier to the storage server, instead of a user master password.

Using this process, the user master password does not need to be stored, not even at the client devices that the user might use, and if it is held in memory temporarily, it can be discarded. The user master password also does not need to be transferred through the network because it is not used for online authentication. Thus, while each user may have a user master password that does not travel, there are also Unique User Device Keys (UDKs) per user and per device that may be stored. Thus, a user and/or device may have multiple UDKs. In some embodiments, the UDKs may be referred to as unique device indicators (UDI).

Examples of UDKs might include a random or pseudorandom number sent with the one-time password message or otherwise generated, possibly with another part derived from hardware and/or software characteristics of the user's device. In some embodiments, the UDK may be unique for all devices.

In one embodiment, instead of sending the Unique UDK directly to the server, the server may send a One Time Challenge to the client. The client may modify the challenge using the UDK and return it to the server. The server may then verify the challenge was completed successfully. This use of a challenge may secure the authentication process against a replay attack. In another embodiment, the UDK may be different on the server than on the client. The server or client may generate a public key and a private key (the private key may be sent to and/or stored by the client) using "Public Key Infrastructure." The system may also use a similar "challenge" system as described.

Thus, while the UDKs are used to authenticate the user device and other keys might be used for logging in and other actions that require some validation at the storage server, the user's master password is only used to encrypt and decrypt the user's data, and since encryption and decryption only occurs at the user side, neither the user master password nor any hash or any part of it need be stored at the storage server.

Figure 2:
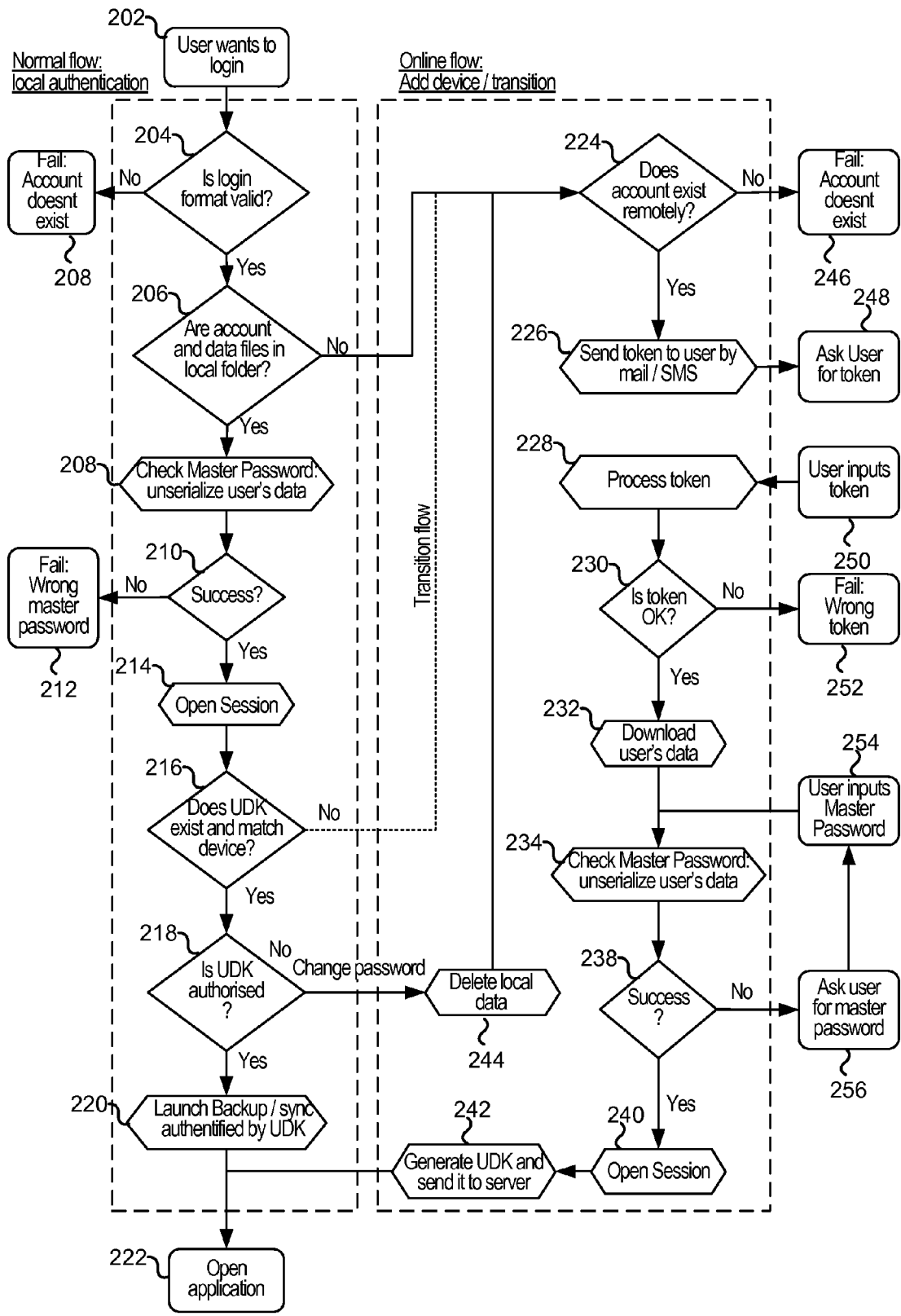
FIG. 2 is a flowchart illustrating operations of an example flow in accordance with at least one embodiment.

For example, FIG. 2 illustrates an example flow of a storage access process. This process may be accomplished by computing resources such as those seen in FIG. 1 including client devices 20, webserver 50 and ISP 80. A user requests 202 to login to a storage service. If the login format is not 204 valid, the request may fail 208 as the account does not exist with an invalid format. If the format is 204 valid, a local device may determine if account and/or data files exist 206 in a local folder. If they exist 206, the master password may be verified 208 and user data may be unserialized. If unserialization is 212 unsuccessful, failure may be due 212 to a wrong master password. However, if unserialization is 210 successful, a session may be opened 214 to the storage service. If the device UDK exists and matches 216 the device and is 218 authorized, a backup and/or sync may be launched 220 as authenticated by the UDK. An application may then be launched 22 to facilitate further operations of the process, such as managing the backup and/or sync.

In the event that the account and/or data files are not 206 in a local folder or the UDK does not exist and match 216 the device, the storage system may be queried 224 to see if the account exists remotely. If not 224, the process may fail 246 because no account exists. However, if the account does exist 224, a token may be sent 226 to the user, such as by SMS or email. The user may then be asked to input the token 246. After the user inputs 250 the token, the storage system may process 228 the token. If the token is not validated 230, the storage system may stop 252 due to a failure of token verification. However, if the token validates 230, at least a portion of the user's data may be downloaded 232 from the storage server to the device. The user may then use a mater password to unserialize 234 user data. If not successful, the user may be prompted 256 to attempt another master password and receive 254 the master password. If there is success 238 in unserializing the data, a session 240 may be opened between the client and the storage server. A UDK may be generated 242 and sent to the storage server. An application may then be opened 222 to aid in furthering the management and/or use of the user data. In some embodiments, a password change 218 may cause local data to be deleted 244 before checking if the account exists 224 remotely.

A More Specific Example

Figure 3:
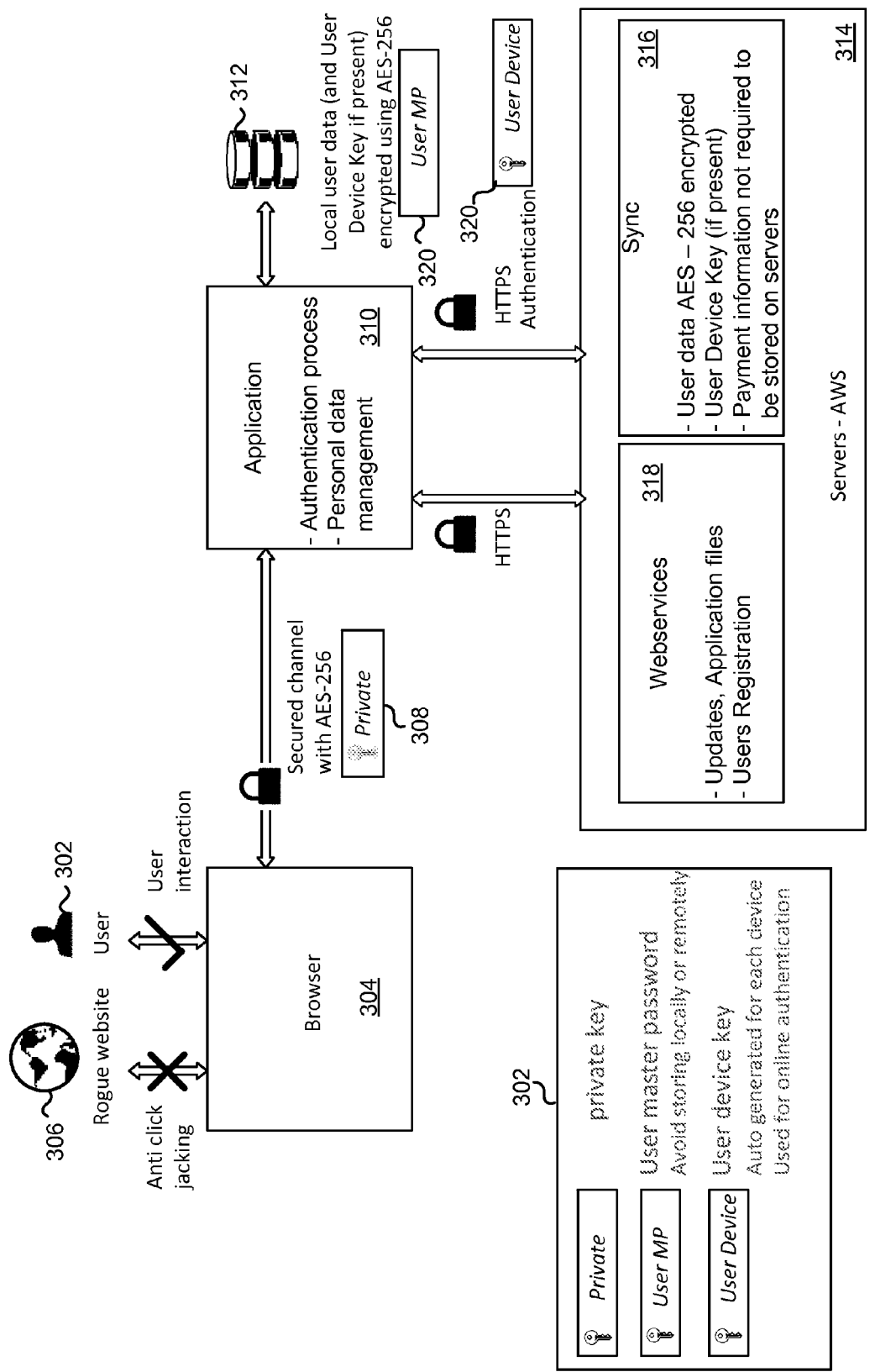
FIG. 3 illustrates a process of authentication used by a storage service system in accordance with at least one embodiment.

In one embodiment, such as the one shown in FIG. 3, a process of authentication used by a storage service system is shown. A user 302 interacts with a browser 304 to access a storage application 310 over a secure connection. The user may use a private key 308 to request operations from the storage application 310 and ensure data distribution to authenticated user devices having UDKs 320. Data 312 may be encrypted by a master password 312 that is not communicated externally from the device. The device may communicate with services 318 and 316 running on servers 314 to provide storage services. Services may include application services 318 that include updates, application files and registration services. Other services may include synchronization services that store encrypted data, authorize devices based on UDKs.

In another example, a user stores data (credit card information, personal information, etc.) securely. The data may be available on a variety of user devices as part of the system. However, an attack on a storage server may fail. The data may be protected from attackers inside and outside a security border of the storage server. For example, if non-employees and employees of a company hosting and operating the storage server attempt to access the user's data, the data may be unavailable to them.

In the architectural model described in this section, protection of user data stored by the storage server relies on two separate secrets: (1) a user master password and (2) a unique user device key ("UDK") for each device enabled by a user for accessing the user's data. A user master password is not needed to be stored locally or remotely, as the UDK may be used in authentication. The user master password may be used to generate cryptographic keys for encrypting/decrypting the user data. One UDK might be present for each device enabled by a user, with the UDK being auto-generated as part of a device authentication process.

At least some of the user's data may be stored locally. Other user data might be stored elsewhere. In a first operation in an authentication process, the user-side process (such as a client app) accesses that user data. That user-side process might prompt the user for the user master password to decrypt the user data. The user-side process might generate, from the user master password and possibly also a salt value, a symmetric AES (advanced encryption standard) 256-bit key for ciphering and deciphering the user's personal data on the user's device.

In one embodiment, the data ciphering and deciphering might be performed using functions of the OpenSSL protocol, such as generating a 32-byte salt value using the OpenSSL RAND_bytes function (ciphering) or reading it from the AES ciphertext (deciphering). The user master password may be used with the salt, to generate the AES 256 bit key that will be used for (de)ciphering. This generation might be performed using the OpenSSL PKC5_PBKDF2_HMAC_SHA1 function, using more than 10,000 iterations in some implementations. A 32-byte initialization vector is generated with the OpenSSL EVP_BytesToKey function using SHA1. Then, the data is ciphered or deciphered using CBC mode. When ciphering, the salt can be written into the AES file. While this is a description of one ciphering algorithm, other ciphering algorithms or hash algorithms may be used.

With this approach, the user master password need never be stored anywhere, not on the storage server, not locally in a user device and does not need to transit over a network.

Authentication

The storage server might be part of a larger system, such as a task and shopping automation and assistance system, or a data synchronization system. An example system might be file synchronization services between devices. Users may authenticate to the storage server in order to get controlled access. Authentication of the user may be based on the UDK and may have no relationship with the user master password. In some embodiments, a device is prevented from using the master password. When a user creates an account or adds a new device to synchronize his or her data, a new UDK is generated to apply to a device.

In a specific example, the UDK comprises two parts: (1) a first part, which is a predictable part based on some hardware and software characteristics of the user's device, and (2) a second part, being a 38-character string (possibly comprising lowercase letters, capital letters, and numbers) generated using the OpenSSL RAND_byte function. This UDK is then stored locally in the user data, ciphered as with other user data, as explained earlier, and sent to the storage server. When a user has gained access to his or her data using his or her user master password, the client software and the storage server can then access the user's UDK to authenticate him on the storage server without requiring any user interaction. As a result, the storage server does not need access to, or storage for, the user master password to perform authentication.

Communication

Communications between the user-side application (such as the client application or other client) and the storage server may be secured with HTTPS. For example, HTTPS connections on the client side can be performed using the OpenSSL protocols. On the server side, the servers may use a Verisign Class 3 Extended Validation SSL certificate or a DigiCert High Assurance CA-3 certificate with key length of 2048 bits and SHA1+RSA for a signature algorithm. The HTTPS communications between the user-side application and the storage servers might use the SSLv3 protocol, with TLS_RSA_WITH_AES_256_CBC_SHA connections.

In the SSL protocol, the operations may include:
1) The client and the server negotiate to choose the best cipher and hash algorithm available on both sides;
2) The server sends its digital certificate to the client;
3) The client verifies the certificate by contacting a Certificate Authority;
4) The client encrypts a random number (which could just as well be pseudorandom) with the server's public key, and sends it to the server; and
5) The server decrypts this number, and both sides use this number to generate a symmetric key, used to encrypt and decrypt data.

Impact on Potential Attack Scenarios

Today, cloud based services make various choices to encrypt their user data, such as how many secrets to use and where the secrets are stored. These choices have certain important consequences in terms of security. Cloud Services may use a single private secret, usually under their control, to encrypt all user data. As a simpler choice from an implementation standpoint, it offers the advantage of facilitating deduplication of data, which can provide important economic benefits when the user data volume is important. However, a single secret is not an optimal scenario from a security standpoint. If the key is compromised (by a hacker attack or rogue employee), all user data may be exposed.

Figure 4:
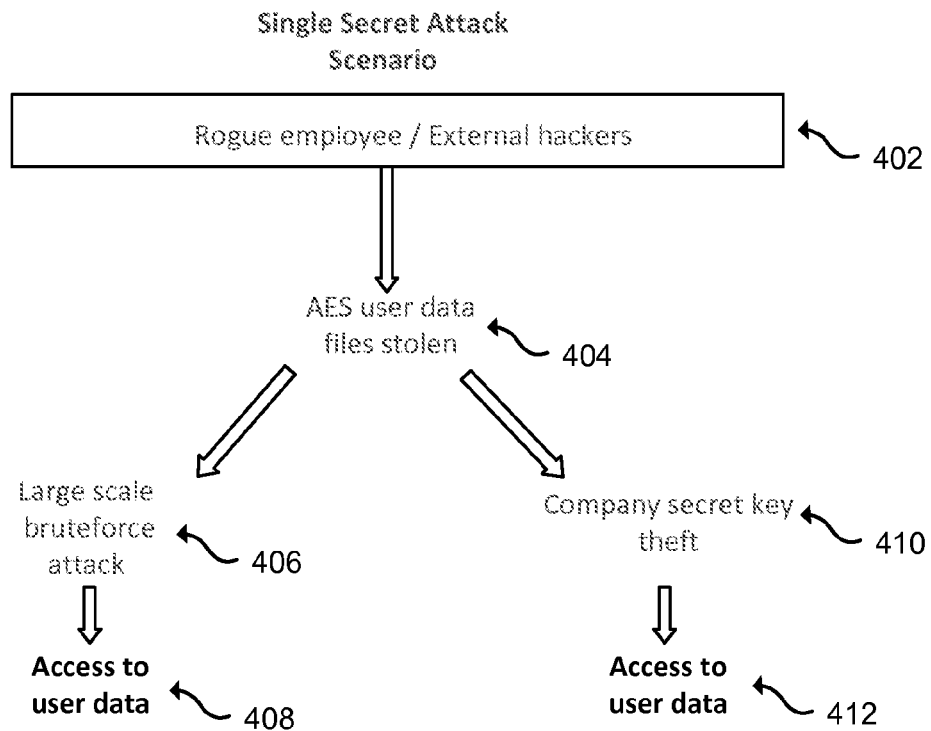
FIG. 4 illustrates one possible attack scenario in accordance with at least one embodiment.

For example, a single secret breach is shown in FIG. 4. An employee or hacker 402 may obtain access to user data 404 secured by encryption, such as AES. A brute force attack 406 without the secret key may lead to access of user data 408, as only one key need be found. If the secret key is compromised 410, then user data 412 may also be compromised.

Figure 5:
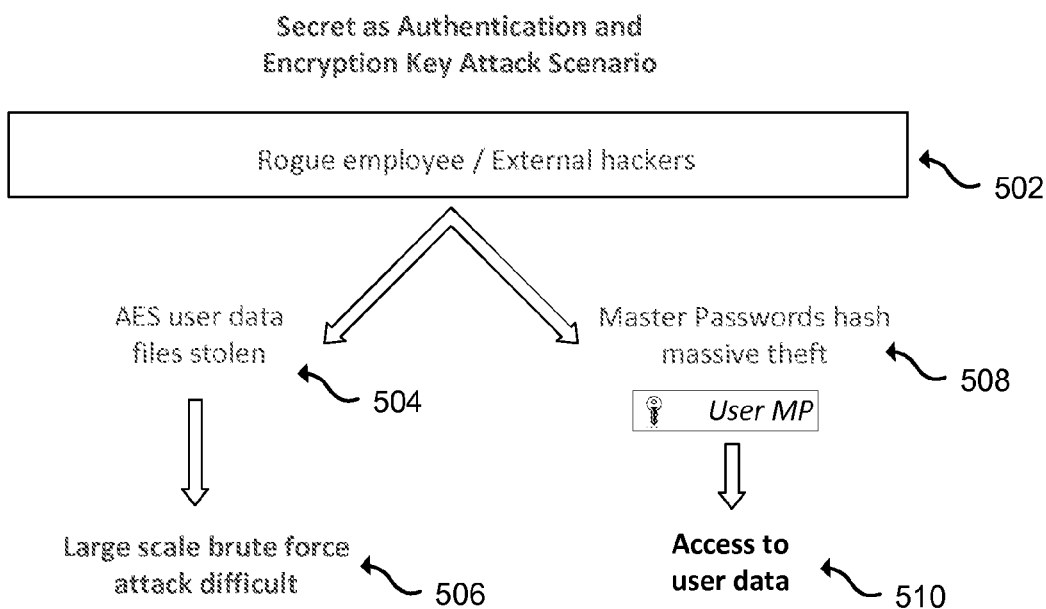
FIG. 5 illustrates another possible attack scenario in accordance with at least one embodiment.

A better alternative is to use a different key for each user. The most common practice is to ask the user to provide a (strong) master password and to derive the encryption key for each user from his or her master password. However, to keep things simple for the user, many services or applications tend to also use the user's master password or a derivative as an authentication key for the connection to their services. This implies that they have to store some kind of hash of the user's master password on their servers, which makes them potentially subject to certain attack scenarios (such as a "Rainbow Table" attack), as illustrated in FIG. 5.

For example, a rogue employee or external hacker 502 may breach the storage service. If the user data is taken 504, access to all of the user data may be difficult 506 because each user secures their data with a different user master password. However, if the user master passwords 508 are stolen from the authentication part of a storage system, access to the user data 510 may be accomplished as the user master passwords are now available for use.

Figure 6:
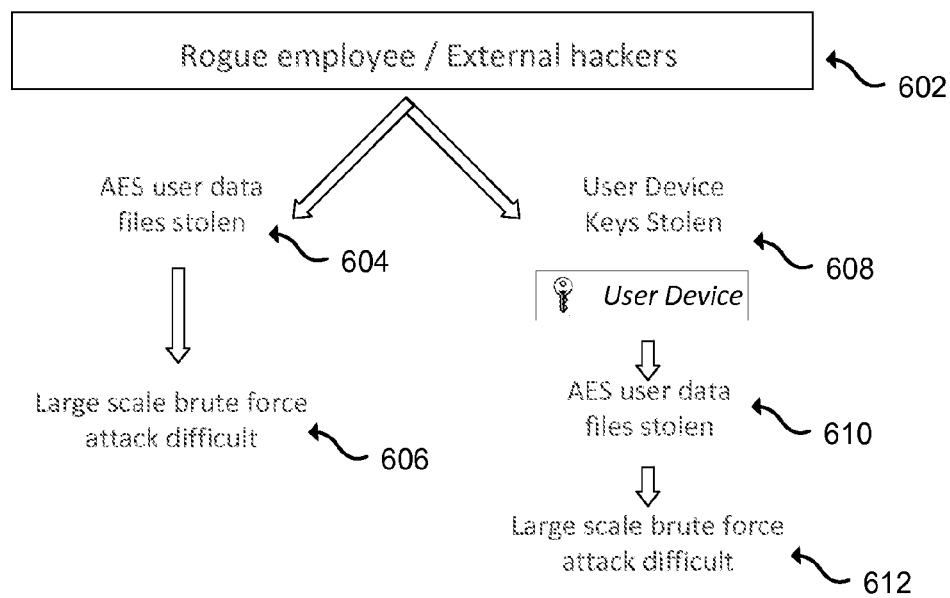
FIG. 6 illustrates how a storage service system described herein avoids attack scenarios in accordance with at least one embodiment.

FIG. 6 illustrates how a storage service system described herein avoids attack scenarios. In order to make the above attacks scenario difficult (i.e. more trouble than it could be worth), the key used for user data encryption and the key used for server based authentication may be independent. The user data may be encrypted with a key that is a derivative of the user master password. A separate UDK (that may be unique to each device-user pair) is used to perform authentication on the storage servers. This UDK may be automatically generated by the storage server. As a result, encryption keys for user data need not be stored anywhere; a storage server provider employee would have a difficult time attempting to decrypt user data. This allows user data to be protected even if the storage servers are compromised.

For example, a rogue employee or external hacker 602 may breach the storage service. If the user data is taken 604, access to all of the user data may be difficult 606 because each user secures their data with a different user master password. However, if the authentication keys are stolen, such as the UDKs 608, and the user data files stolen 610, a brute force attack would be difficult 612. The UDKs are not used in encryption and therefore only provide authenticated access to the encrypted files, not the decrypted files. Decryption is with a separate master password that is unknown to a storage server.

Even if this scenario happens, a rogue employee or an external hacker would have a very hard time executing a brute force or a dictionary attack on the AES user data files. For example, a PBKDF2 algorithm (Password-Based Key Derivation Function 2 from RSA Laboratories' Public-Key Cryptography Standards (PKCS)) might be used, with more than 10,000 iterations. As the user data is encrypted using a key which is a derived from their user master password, a large scale attack is difficult.

As an example, a benchmark of attempts to decipher AES encrypted files using a Xeon 1.87 GHz processor (4 cores) is shown in Table 1:

TABLE 1

| | Time to get password on a Xeon 1.87 GHz (4 cores) | |
| --- | --- | --- |
| Type of brute force attack | AES 256 | AES 256 with PBKDF2-SHA1 with 10000 iterations |
| 4 million term dictionary | 2.8 seconds | 21 hours |
| Alphanumerical (small caps + digits) password of 7 characters | 15.7 hours | 48.6 years |
| Alphanumerical (small caps + digits) password of 8 characters | 23.6 days | 1751.3 years |

Table 1 represents the time it would take on a Xeon 1.87 GHz processor (with 4 cores) to determine a password used to protect user data. Without using PBKDF2, those numbers show that even with a strong password, an attacker may be able to determine the user password within less than a month. Using PBKDF2, and given that the storage server enforces reasonably strong password requirements (e.g., requiring at least one uppercase letter, one lowercase letter, and one digit and at least eight characters, to avoid a user master password being contained in a dictionary), an attack may be impractical.

There may be a limit to any security architecture. If the user's computer is physically compromised and an attacker is able to install a keylogger allowing the attacker to capture all keystrokes, then a password based security system may not prevent data theft or piracy. An end user still remains responsible for physically protecting a computer from non-authorized access and for making sure he is not installing potentially infected software. Yet an advantage of many of the embodiments is that a storage server user may be more secure than if sensitive personal data was stored in documents or passwords that were cached in a browser cache.

Details on Authentication Flow

Figure 7:
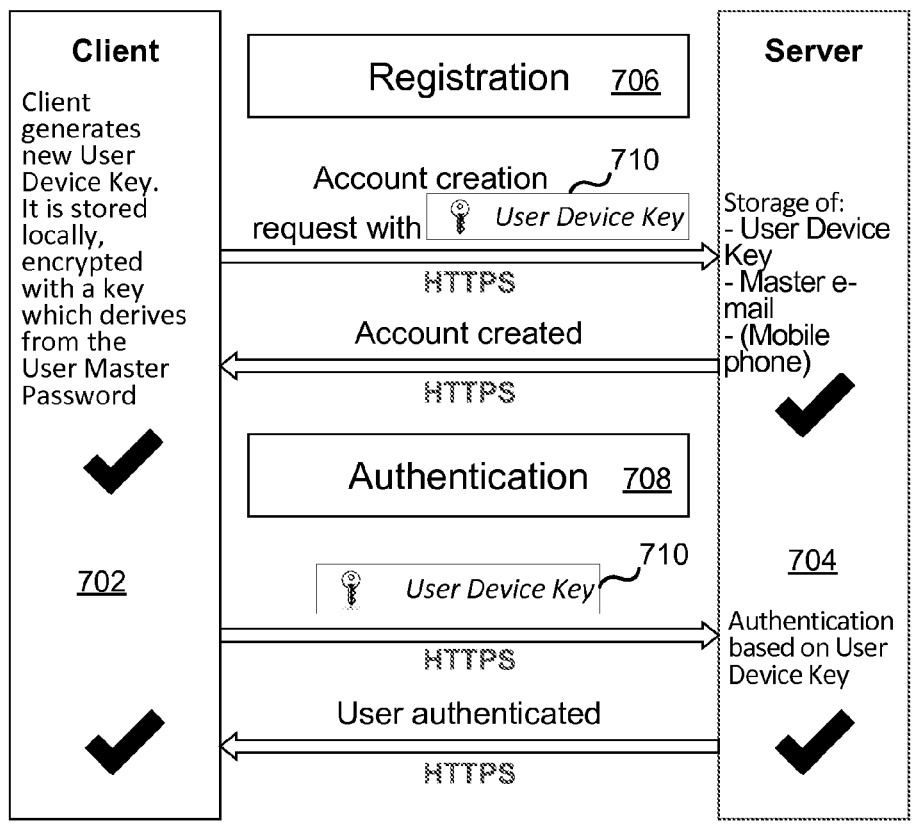
FIG. 7 is a flowchart illustrating a possible authentication flow in accordance with at least one embodiment.

The initial registration for a user follows the flow described in FIG. 7. FIG. 7 is a flowchart illustrating a possible authentication flow. As can be seen in FIG. 7, the user master password is never user to perform server authentication, and the only keys stored on the servers are the UDKs.

A client 702 may perform registration 706 and authentication 708 with a server 704. This process may be accomplished by computing resources such as those seen in FIG. 1 including client devices 20, webserver 50 and ISP 80. During registration 706, a client 702 may generate a new UDK 710. The UDK 710 may be encrypted on the client 702 using a key that derives from the user master password. The server 704 may then receive a request from the client 702 to add the UDK to an account. Using a second channel of communication, such as e-mail or SMS, the server 704 may verify the client 702 should be added to the account. The account may then be successfully created.

During authentication 708, the client 702 may use the UDK previously created to authenticate to the server 704. The server may verify the UDK is stored as associated with the account and the data requested. If verified, the server may then provide access to the client 702 to operate on the data.

Figure 8:
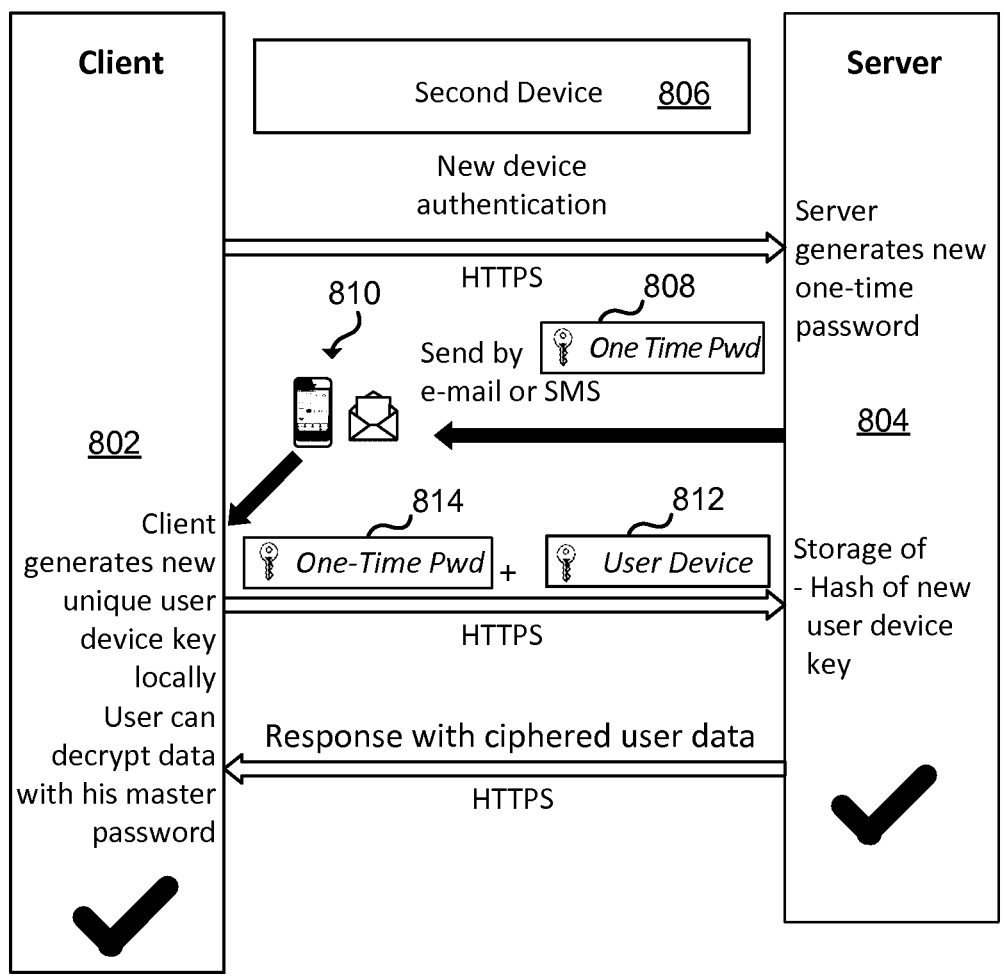
FIG. 8 is a flowchart illustrating a possible authentication process when adding a new device in accordance with at least one embodiment.

FIG. 8 is a flowchart illustrating an embodiment of an authentication process when adding a new device. When adding a second device 806, the storage server 804 verifies the user adding the additional device is indeed the legitimate owner of the account. The verification serves to gain additional protection in the event the user master password has been compromised and an attacker who does not have access to an enabled device is trying to access the account from a second device.

As shown in FIG. 8, when a client 802 is attempting to connect to a storage server 804 account on a device that has not yet been authorized for this account, the storage server generates a One-Time Password 808 (such as a token) that is sent to the account owner. The One-Time Password 808 may be sent via message 810 to the email address used to create the storage server account initially, or by text message to the user's mobile phone if the user has chosen to provide his mobile phone number.

In one embodiment, the user enters both a user master password and the received One-Time Password to enable the new device. After this two-factor authentication has been performed, the storage servers 804 may start synchronizing the user data on the client 802. Communication can be handled with HTTPS and the user data may be traveling in AES-256 encrypted form.

Figure 9:
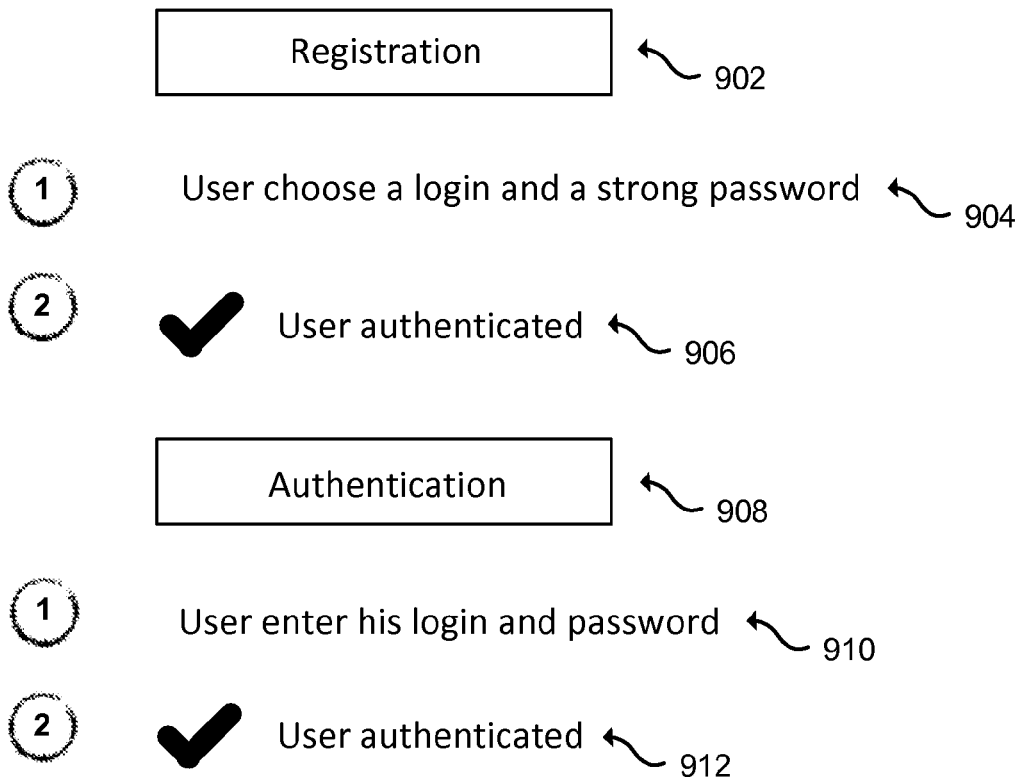
FIG. 9 is a sample set of operations for registration as with FIG. 7 in accordance with at least one embodiment.
Figure 10:
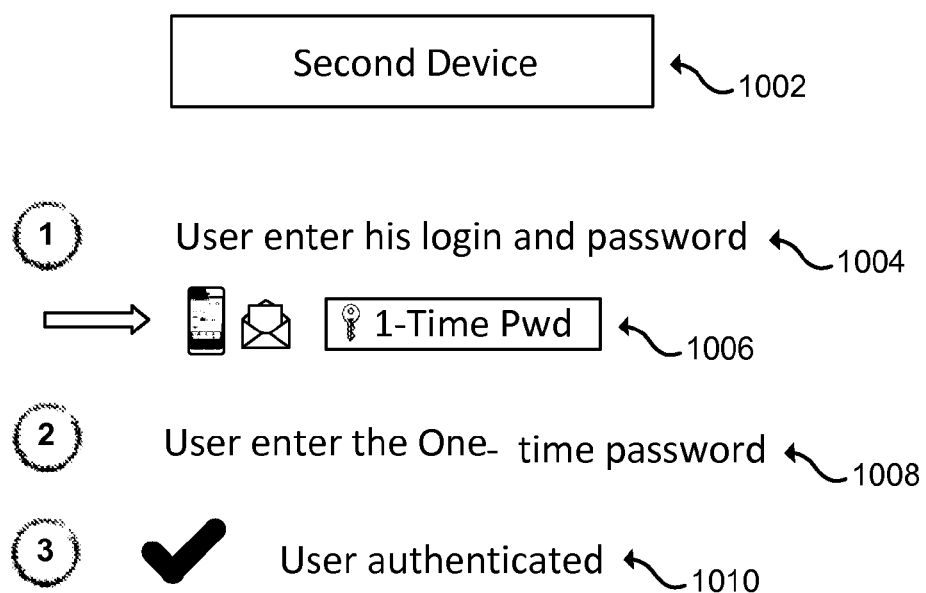
FIG. 10 is a sample set of operations for registration as with FIG. 8 in accordance with at least one embodiment.

An advantage to this system is that complexities may be hidden to the user. The operations of FIG. 7 may be performed in the background to secure the user device with a user responsible for determining a secure user master password. Other keys can be generated by the application without user intervention. When adding an additional device, the complexities may also be hidden, while remaining secure through the use of two-factor authentication described in FIG. 8. An example process from a user perspective is shown in FIG. 9 and FIG. 10. FIG. 9 represents an embodiment of a set of operations for registration as with FIG. 7. FIG. 10 represents an embodiment of a set of operations for registration as with FIG. 8.

For example, actions of a user may include registration 902 and authentication 908 as seen in FIG. 9. For registration 902, a user may choose 904 a login identifier and a strong password. The user may then create the account and become authenticated 906 by providing the credentials. For authentication 908, the user may enter 910 the login identifier and the password selected previously. The user may then become authenticated 912 to the system. It should be noted that while the user may perceive the password providing access to storage servers, the password may actually never leave the device. Instead, in some embodiments, the password simply decrypts the UDK which is then transmitted to the storage server to authenticate the device.

In another example, actions of a user may include 1002 adding a second device. A user may enter 1004 a login and password, which results in a one-time password being generated and sent 1006 to the client. The user may then enter 1008 the one-time password in the device. The user device may then be authenticated 1010 to the storage server. While the user may perceive the login and password providing access to the storage server, the credentials may not leave the user device. Instead, in some embodiments, a challenge may be issued to the user device to prove access to the password. Should the challenge pass, the one-time password may be sent to complete the process.

In one embodiment, a computer system executing secure storage and communication between a user device and a storage server is provided. This system implements the computerized method for processes previously described. Such a system may include at least one multimedia device with a screen, a hardware interface connected to said multimedia device, means of connection to the internet, a computer processor in electronic link with a computer program stored on a storage medium readable by said multimedia device, said computer program comprising instructions that when executed by the processor implement the method of the invention. In one embodiment, the multimedia device is a computer or mobile phone.

Further embodiments can be envisioned to one of ordinary skill in the art after reading this disclosure. In other embodiments, combinations or sub-combinations of the above disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. A computer-implemented method, the method comprising:
   receiving a user master password at a client device on behalf of a user;
   generating, during a device authentication process, a unique user device key identifier comprising a first portion generated based on a hardware identifier associated with the user device and a second portion generated based on a portion of the user master password, wherein the generated unique user device key identifier is not used to encrypt data on the user device;
   decrypting the unique user device key identifier with the user master password at the client device, wherein the unique user device key identifier is specific to a unique combination of the user and the client device, and wherein decrypting the unique user device key identifier comprises generating, at the client device, a cryptographic key from the user master password and decrypting, at the client device, a user file containing an encrypted unique user device key identifier using the generated cryptographic key;
   sending a request to access a storage server from the client device without sending either of the user master password or a hash of the user master password;
   sending the unique user device key identifier to the storage server; and
   in response to sending the unique user device key identifier, receiving access to elements of the storage server controlled by the user.

2. The computer-implemented method of claim 1, wherein receiving access to elements of the storage server further comprises:
   receiving, by the client device, encrypted data stored by the storage server; and
   decrypting the encrypted data by the client device based at least in part on the user master password.

3. The computer-implemented method of claim 1, wherein receiving access to elements of the storage server further comprises:
   encrypting data on the client device based at least in part on the user master password; and
   uploading, by the client device, the encrypted data to the storage server.

4. The computer-implemented method of claim 1, further comprising providing an access restriction that prevents the user master password from being sent to the storage server.

5. The computer-implemented method of claim 1, further comprising:
   sending, over a first channel of communication, the request to access the storage server; and
   receiving an authorization code for the client device via a second channel of communication.

6. One or more non-transitory computer-readable storage media having collectively stored thereon executable instructions that, when executed by one or more processors of a computer system, cause the computer system to at least:
   send, by a client device over a first channel of communication, a request to access a storage server on behalf of a user;
   receive an authorization code via a second channel of communication;
   authenticate, for the user, the client device using the authorization code;
   generate, during a device authentication process, a unique user device key identifier specific to a unique combination of the user and the client device, wherein a first portion of the unique user device key identifier is generated based on a hardware identifier associated with the user device and a second portion is generated based on a portion of the user master password, wherein the generated unique user device key identifier is not used to encrypt data on the user device;
   send the unique user device key identifier to the storage server;
   encrypt the unique user device key identifier on the client device, wherein encrypting the unique user device key identifier on the client device further comprises:
      encrypting the unique user device key identifier using a user master password;
      decrypt the unique user device key identifier using the user master password, wherein decrypting the unique user device key identifier comprises generating, at the client device, a cryptographic key from the user master password and decrypting, at the client device, a user file containing the encrypted unique user device key identifier using the generated cryptographic key;
      send the unique user device key identifier to the storage server without sending either of the user master password or a hash of the user master password; and
      in response to sending the unique user device key identifier, receive access to elements controlled by the user.

7. The one or more non-transitory computer-readable storage media of claim 6, wherein receiving access to elements controlled by the user, when the client device provides the unique user device key identifier to the storage server further comprises:
   receiving encrypted data from the storage server; and
   decrypting the encrypted data using the user master password.

8. The one or more non-transitory computer-readable storage media of claim 7, wherein the instructions further comprise instructions that, when executed, cause the computer system to at least provide an access restriction that prevents the user master password from being transmitted externally.

9. The one or more non-transitory computer-readable storage media of claim 6, wherein receiving access to elements controlled by the user further comprises:
   encrypting local data using the user master password; and
   sending the encrypted local data to the storage server.

10. The one or more non-transitory computer-readable storage media of claim 9, wherein the instructions further comprise instructions that, when executed, cause the computer system to at least provide an access restriction that prevents the user master password from being transmitted externally.

11. The one or more non-transitory computer-readable storage media of claim 6, wherein generating the unique user device key identifier further comprises generating the unique user device key identifier based at least in part on information about device hardware of the client device.

12. A computer system, comprising:
one or more processors;
memory, operatively connected to the one or more processors and including instructions that, when executed by the one or more processors, cause the computer system to perform a method, the method comprising:
   receiving a user master password at a client device on behalf of a user;
   generating, during a device authentication process, a unique user device key identifier comprising a first portion generated based on a hardware identifier associated with the user device and a second portion generated based on a portion of the user master password, wherein the generated unique user device key identifier is not used to encrypt data on the user device;
   decrypting a unique user device key identifier with the user master password at the client device, wherein the unique user device key identifier is specific to the user and the client device, and wherein decrypting the unique user device key identifier comprises generating, at the client device, a cryptographic key from the user master password and decrypting, at the client device, a user file containing an encrypted unique user device key identifier using the generated cryptographic key;
   sending a request to access a storage server from the client device without sending either of the user master password or a hash of the user master password, wherein sending the request to access includes using the unique user device key identifier in the request; and
   in response to sending the request using the unique user device key identifier, receiving access to elements of the storage server controlled by the user.

13. The system of claim 12, wherein the method further comprises:
   sending, over a first channel of communication, the request to access the storage server; and
   receiving an authorization code for the client device via a second channel of communication.

14. The system of claim 12, wherein the method further comprises:
   receiving, by the client device, encrypted data stored by the storage server; and
   decrypting the encrypted data by the client device based at least in part on the user master password.

15. The system of claim 12, wherein the method further comprises:
   encrypting data on the client device based at least in part on the user master password; and
   uploading, by the client device, the encrypted data to the storage server.

16. The system of claim 12, wherein using the unique user device key identifier in the request comprises sending the unique user device key identifier as part of the request.

17. The system of claim 12, wherein using the unique user device key identifier in the request comprises using the unique user device key identifier to derive a value included in the request.

* * * * *